UNITED STATES PATENT OFFICE.

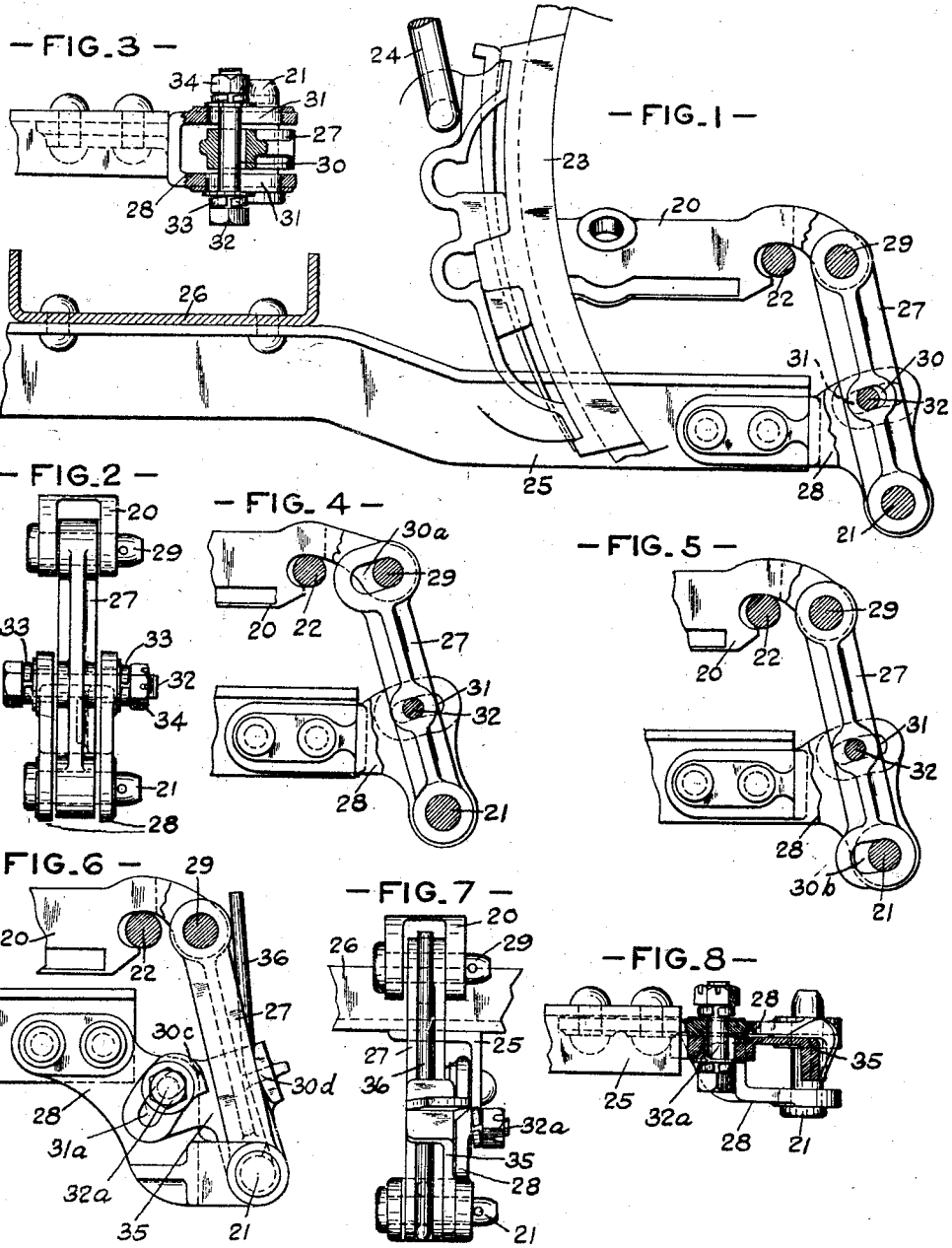

THOMAS L. BURTON, OF ST. LOUIS, MISSOURI.

BRAKE-BEAM SUPPORT.

1,364,073.   Specification of Letters Patent.   Patented Jan. 4, 1921.

Application filed December 4, 1918. Serial No. 265,213.

*To all whom it may concern:*

Be it known that I, THOMAS L. BURTON, a citizen of the United States, residing at the city of St. Louis, in the State of Missouri, have invented certain new and useful Improvements in Brake-Beam Supports, of which improvement the following is a specification.

This invention relates to supports for brake beams and more particularly to what is known as the third point support in which one or more bars attached to the spring plank of the truck extend beneath the brake beam and are provided with supporting means connected to some portion of the brake beam between its ends, such as the middle strut or the truss rod. The object of my invention is to provide an additional support of this character which shall also have the function of regulating the amount of clearance between the brake shoe and wheel and maintain said clearance substantially constant under the various conditions of wear of the shoe and the wheel.

In carrying out my improvement, I provide an additional supporting link, one or more, connected to the supporting bar and to an intermediate portion of the brake beam, and having means for limiting the release movement of the beam to a certain amount and means for automatically shifting or adjusting said limiting means to compensate for the wear of the brake shoes and wheels.

In the accompanying drawing, Figure 1 is a side elevation, partly in section, illustrating one form of my improvement; Fig. 2, an end view of the bracket and supporting link; Fig. 3, a horizontal section of the same; Fig. 4, a side elevation showing a modification; Fig. 5, a similar view showing another modification; Fig. 6, a similar view showing still another modification; Fig. 7, an end view of the construction shown in Fig. 6; and Fig. 8, a horizontal section of the same.

The brake beam may be of the ordinary trussed type having a central strut, 20, a truss rod 22, and a main compression member carrying brake shoes 23 at its ends, with the usual hangers 24, as shown in Fig. 1. The safety supporting bar 25, one or more, may be attached to the spring plank 26, of the truck and extend beneath the brake beam, the additional supporting link 27, being pivotally connected at the end of the supporting bar and to the brake beam.

According to my improvement the supporting link and its connections are provided with stop means, such as a slot and pin, for limiting the release movement of the brake beam to a certain amount of clearance at the brake shoe, and said stop mechanism is automatically adjusted by the application movement of the brake beam, to compensate for the wear of the shoe and wheel. As shown in Figs. 1, 2 and 3, the link 27, is pivoted at its lower end by the pin 21 to the bracket 28, attached to the end of the bar 25, and at its upper end by pin 29 to the end of the brake beam strut 20, while the middle portion of the link is provided with a slot 30. The bracket 28, at the sides of the link opposite the slot 30, is also provided with slots 31 and through said slots 30 and 31 extends the pin or bolt 32, having one or more friction washers 33, and a clamping nut 34. By this means the bolt 32 is held by a certain amount of friction in whatever position in the slot 31 it may be located, but its position in said slot may be shifted by applying sufficient force to overcome said frictional resistance. The slot 30 in the link 27 is formed of a suitable length to permit the desired release movement of the brake beam and limit the clearance of the brake shoes from the wheels to a predetermined amount. The slot 31 in the bracket is somewhat longer than the slot 30.

When the brakes are in the applied position, as indicated in Fig. 1, the bolt 32 will engage one end of the slot 30 in the link 27, and when the brakes are released and the beam swings away from the wheel, the link 27 will turn upon its lower fulcrum pin 21, until the bolt 32 engages the other end of the slot 30. This serves as a stop and prevents further release movement of the brake beam, since the friction of the bolt 32 in the slot 31 of the bracket is sufficient to hold it from being shifted under the release action of the brake rigging. If there should be a tendency for some brake beams to make a greater release movement than others under the action of the usual release springs, the improved limiting means will prevent any excessive movement of any such brake beam while at the same time the releasing action will be distributed evenly throughout the system, thereby producing substantially uniform release clearance at all of the brake shoes.

As the brake shoes and wheels wear and it becomes necessary for the brake beams to make a longer travel in moving up to the applied position it will be seen that the bolt 32 will be engaged by the end of the slot 30 in the link 27 before the shoes have reached their full bearing against the wheels and that the force of the application movement will then readily overcome the frictional resistance of the bolt 32 and shift the same along the slot 31 in the bracket 28 to such point as may be necessary to effect the full bearing of the brake shoes. In this way the bolt 32 is automatically shifted to compensate for the wear of the brake shoes and wheels and the clearance of the shoes from the wheels during the release movement of the brake beams is maintained substantially constant at all times.

In the modification shown in Fig. 4, the limiting slot 30ᵃ, for determining the free release movement and the amount of clearance is located at the upper end of the link 27, on the pin 29, while the bolt 32 is fixed in said link. In this construction, the pin 29 merely slides forward and backward in the slot 30ᵃ, in the ordinary application and release movements of the brake beam without moving the link 27 except when, due to wear, the brake beam makes a longer traverse in the application movement, then the pin 29 turns the link 27 upon its lower pivot 21 and shifts the bolt 32 to a further position in the slot 31. The bolt then holds the link in the adjusted position until it is again automatically shifted to compensate for further wear.

In the modification shown in Fig. 5, the construction is substantially the same except that the limiting slot 30ᵇ, is located at the bottom of the link on the pin 21. In this case, the link ordinarily swings back and forth on the bolt 32 as a fulcrum during the usual application and release movements of the brake beam, the lower end of the link moving the slot 30ᵇ relative to the pin 21, but when, due to wear, a greater movement is made to bring the shoes against the wheels, the bolt 32 is shifted in the slot 31, thereby adjusting the position of the fulcrum of the link to compensate for wear of brake shoes and wheels.

In the modification shown in Figs. 6, 7 and 8, the friction bolt 32ᵃ, instead of extending through the link 27, is mounted in the bracket 28 and extends through a slot 31ᵃ, in a separate arm 35, also pivoted on the pin 21 and having suitable stops 30ᶜ, and 30ᵈ, for limiting the relative movement of the link 27. The free movement of the link between the stops is similar to that defined by the slot, 30, in Fig. 1, during the ordinary application and release movements, but when a further application movement is made due to wear, the link by its engagement with stop 30ᵈ shifts the arm 35 on its pivot, overcoming the friction of the bolt 32ᵃ and bringing the same to another position in the slot 31ᵃ. The arm 35 with its stops for limiting the release movement is thus automatically shifted to compensate for wear of brake shoes and wheels and the clearance is maintained substantially constant. If desired, a separate release spring, such as 36, may be employed tending to keep the link in its release position bearing against the stop 30ᶜ, and thus assist in the distribution of the release action through the system.

It will now be seen that all of the modifications show constructions embodying the essential features of my improvement comprising an additional supporting link connected to the safety bar and provided with stop mechanism adapted to limit the release movement of the brake beam to the desired amount of clearance, and means operating automatically to adjust said stop mechanism to compensate for wear of the brake shoes and wheels.

Having now described my invention what I claim as new and desire to secure by Letters Patent is:

1. In a brake beam support, the combination of a safety bar, a supporting link connected thereto and to the brake beam, stop means for limiting the release movement, and means for automatically adjusting said stop means operated by the movement of the link to compensate for wear.

2. In a brake beam support, the combination with a safety bar and a supporting link connected thereto, of a stop means associated with said link for limiting the release movement of the brake beam, and means operated by the application movement of the link for adjusting said stop means to compensate for wear.

3. In a brake beam support, the combination with a safety bar and a support carried thereby for the brake beam, of adjustable stop means associated with said support for limiting the release movement of the brake beam, and means operated by the movement of said support for automatically adjusting said stop means to compensate for wear.

4. In a brake beam support, the combination with a safety bar and a support carried thereby for the brake beam, of an adjustable stop for limiting the release movement of the brake beam, said stop means having a friction connection for normally holding the same in position, and means for automatically adjusting said stop means to compensate for wear.

5. In a brake beam support, the combination with a safety bar and a supporting link pivotally connected to said bar and to the brake beam, of an adjustable stop for said link, and means operated by the movement of the link for automatically adjusting said stop to compensate for wear.

6. In a brake beam support, the combination with a safety bar and a supporting link pivotally connected to said bar and to the brake beam, of an adjustable stop, having a frictional clamping bolt, for limiting the release movement of said link, and means for overcoming the frictional resistance and shifting the adjustable stop to compensate for wear.

7. In a brake beam support, the combination with a safety bar and a supporting link connected thereto and to the brake beam, of an adjustable stop for limiting the release movement of the link, and means operated by the application movement of the link for shifting said stop to compensate for wear.

8. In a brake beam support, the combination with a safety bar and a supporting link connected thereto and to the brake beam, of an adjustable stop for limiting the release movement of the link, and a spring tending to move said link to its release position against the stop.

9. In a brake beam support, the combination with a safety bar and a supporting link connected thereto and to the brake beam, a stop device including a frictional clamping bolt, for limiting the release movement of the link, and means actuated by the application movement of the link for overcoming the frictional resistance and shifting said stop to compensate for wear.

10. In a brake beam support, the combination with a safety bar and a supporting link connected thereto and to the brake beam, a pivoted arm having a stop for limiting the release movement of the link, a frictional device for said arm, and means for automatically shifting said arm to compensate for wear.

11. In a brake beam support, the combination with a safety bar and a supporting link connected thereto and to the brake beam, a pivoted arm having a stop for limiting the release movement of said link and a portion adapted to be engaged by said link in its application movement, and a frictional device for normally holding said arm in position.

In testimony whereof, I have hereunto set my hand.

THOMAS L. BURTON.